United States Patent
Autenrieth et al.

(10) Patent No.: US 6,254,848 B1
(45) Date of Patent: Jul. 3, 2001

(54) PROCESS FOR THE PRODUCTION OF HYDROGEN-RICH GAS

(75) Inventors: Rainer Autenrieth, Erbach; Barbara Strobel, Dornstadt, both of (DE)

(73) Assignee: Xcellsis GmbH, Kirchheim/Teck-Nabern (GB)

(*) Notice: Subject to any disclaimer, the term of this patent is extended or adjusted under 35 U.S.C. 154(b) by 0 days.

(21) Appl. No.: 09/475,274

(22) Filed: Dec. 30, 1999

Related U.S. Application Data

(62) Division of application No. 09/106,221, filed on Jun. 29, 1998.

(30) Foreign Application Priority Data

Jun. 28, 1997 (DE) ............................................. 197 27 589
Jun. 28, 1997 (DE) ............................................. 19727589

(51) Int. Cl.$^7$ ............................. C01B 3/02; C01B 3/26; C01B 31/18; C01B 31/20
(52) U.S. Cl. .................. 423/648.1; 423/247; 423/437.2; 423/652
(58) Field of Search .............................. 423/437.2, 247, 423/648.1, 652

(56) References Cited

U.S. PATENT DOCUMENTS 3,631,073 * 12/1971 Cohn et al. .
5,432,021 * 7/1995 Wilkinson et al. .................. 423/247

FOREIGN PATENT DOCUMENTS

WO 96/32188   10/1996  (WO) .

OTHER PUBLICATIONS

Patent Abstracts of Japan, E–1580, Jul. 19, 1994, vol. 18/No. 382, JP 6–111838 A, Apr. 22, 1994, Tomiaki Furuya.
Patent Abstracts of Japan, C–854, Jul. 29, 1991, vol. 15/No. 297, JP 3–109202 A, May 9, 1991, Yasushi Fujita.
Patent Abstracts of Japan, C–1099, Aug. 19, 1993, vol. 17/No. 452, JP 5–105403 A, Apr. 27, 1993, Minoru Koga.
Patent Abstracts of Japan, C–1042, Mar. 30, 1993, vol. 17/No. 162, JP 4–325401 A, Nov. 13, 1992, Kozo Osaki.
Patent Abstracts of Japan, JP 07133101 A, Obara Shinya et al.
Patent Abstracts of Japan, vol. 097, No. 003, Mar. 31, 1997, JP 8–301601, Chijiiwa Sakae, Nov. 19, 1996.

* cited by examiner

*Primary Examiner*—Wayne Langel
(74) *Attorney, Agent, or Firm*—Crowell & Moring, L.L.P.

(57) ABSTRACT

A system for generating a high-hydrogen gas comprises a reformer for the catalytic water vapor reforming of a water vapor/fuel mixture while supplying thermal energy; a gas purification stage for removing carbon monoxide from the high-hydrogen gas while releasing heat; and devices for transmitting thermal energy from the gas purification stage into the reformer. The reaction rates in the reformer and in the gas purification stage are designed such that a defined temperature level is set automatically by the coupling of the two reactions.

9 Claims, 1 Drawing Sheet

PROCESS FOR THE PRODUCTION OF HYDROGEN-RICH GAS

This application claims the priority of German Patent Application No. 197 27 589.3, filed on Jun. 28, 1997, the disclosure of which is expressly incorporated by reference herein.

BACKGROUND AND SUMMARY OF THE INVENTION

The present invention relates to a system for generating high-hydrogen gas as well as to a process for starting the device.

Japanese Patent Document JP 4-325401 A discloses a system of the above-mentioned type for generating hydrogen, which has a pre-reforming stage and a shift stage that are separated from one another by a heat exchange surface. At least a portion of the thermal energy required for the water vapor reforming is transferred from the preliminary gas purification stage to the pre-reforming stage.

It is an object of the present invention to provide a system for generating high-hydrogen gas which has a simpler and more compact construction, a higher heat transfer and an improved gas purification function. In addition, it is an object of the present invention to provide a process for the simple and fast starting of the device.

This and other objects and advantages are achieved by the present invention by adding air in a metered manner, and by the subsequent selective catalytic oxidation of the carbon monoxide, thereby ensuring a higher heat development in the gas purification stage and thus a better heating of the reaction space. In addition, a selective oxidation stage, in contrast to a shift stage, has an improved gas purification function. Furthermore, the system has a good cold starting capability, a good dynamic behavior during load changes and an improved efficiency, permitting use in mobile applications. The improved heat yield in the CO oxidation stage is sufficient for completely heating the reformer. An additional heating device is not required. Further, the two reactions can be coupled by a suitable design of the reaction rates in the two partial systems such that a defined temperature level is automatically set in the system. A high-expenditure temperature control is therefore not required.

During the starting of the system, the CO oxidator can temporarily be operated as a catalytic burner, so that the system can be brought to the required operating temperature in a simple and rapid manner.

Other objects, advantages and novel features of the present invention will become apparent from the following detailed description of the invention when considered in conjunction with the accompanying drawings.

DETAILED DESCRIPTION OF THE DRAWINGS

Figure 1:
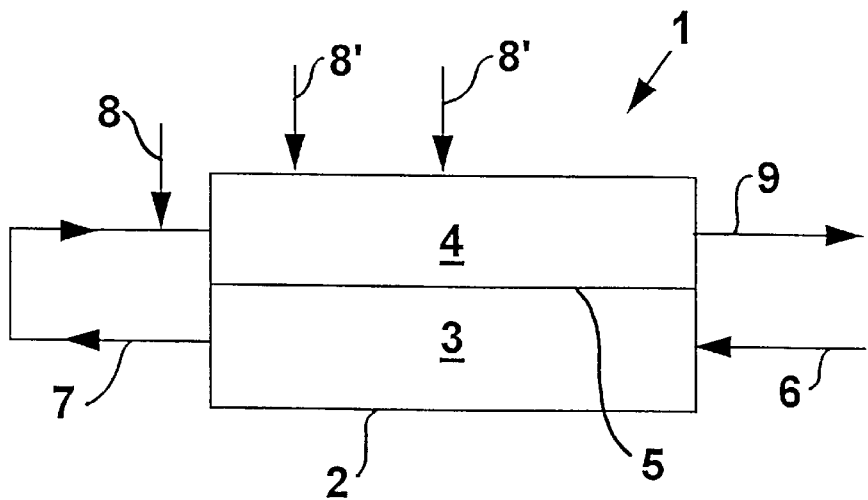
FIG. 1 is a basic diagram of a system for generating high-hydrogen gas.

The system which, as a whole, has the reference number 1 in FIG. 1 consists of a common housing 2 in which a device 3 for the catalytic water vapor reforming of a water vapor/fuel mixture (i.e., reformer) and a device 4 for the selective carbon monoxide oxidation (i.e., CO oxidator) are integrated. The system 1 is constructed as a heat exchanger, with a heat exchange surface 5 provided between the reformer 3 and the CO oxidator 4. Any hydrocarbon-containing starting substances can be used as fuel. The following embodiment will be explained by means of methanol used as the fuel.

A gaseous water vapor/methanol mixture is fed to the reformer 3 by way of a feed pipe 6. After flowing through the reformer 3, the reformate gas is then by way of a reformate feed pipe 7 fed directly into the CO oxidator 4. However, it is also conceivable that the reformer 3 may have several reaction chambers, that the gas purification stage 4 may have several purification chambers, and that the reaction and purification chambers 3, 4 may be arranged in an alternating manner, each being in heat contact with respect to one another by way of a common heat exchange surface 5. By way of an oxygen pipe 8, an oxygen-containing gas, preferably air, is also fed to the CO oxidator 4. This can either, as illustrated in the embodiment, take place into the reformate feed pipe 7 or directly into the CO oxidator 4 or by way of several metering points 8' distributed along the reactor length. After the flow through the CO oxidator 4, the purified reformate gas is then by way of another pipe 9 fed directly to a fuel cell, which is also not shown, or to one or several additional gas purification stages.

In the case of the catalytic water vapor reforming of methanol, while heat is supplied, a mixture of methanol and water vapor is converted on a suitable catalyst to hydrogen; carbon dioxide and carbon monoxide are formed simultaneously:

$$CH_3OH + H_2O \rightarrow 3\,H_2 + CO_2 \text{ or } CH_3OH \rightarrow 2\,H_2 + CO$$

In mobile applications, for example, during the water vapor reforming for fuel cells in motor vehicles, it is important that the required yield of hydrogen gas can be provided while the space requirement and weight are as low as possible. Since the reaction takes place only while heat is being supplied, the yield is a function of the entering heat. The reactor must therefore be constructed such that an optimal heat transfer is ensured from a provided heat source to the reform gas and to the catalyst material.

The CO oxidator 4 is used for removing carbon monoxide CO by means of selective oxidation from the high-$H_2$ gas generated in the reformer 3. This reformate consisting, for example, of hydrogen with a CO fraction of 0.5–3% by volume, after a corresponding purification, is preferably used for the mobile application of PEM fuel cells in vehicles. During the selective oxidation, additional oxygen, for example in the form of ambient air, is supplied to the reformate by way of the oxygen pipe 8, the carbon monoxide CO then being oxidized by the oxygen $O_2$ to carbon dioxide $CO_2$. However, as an alternative, the oxygen can also be charged at one or several points directly into the CO oxidator 4. This reaction is carried out on a suitable oxidation catalyst, particularly platinum and/or ruthenium, on a suitable carrier, such as $Al_2O_3$ or a zeolite in powder form. In this case, air or oxygen is fed to the reformate at an atomic ratio CO to O of approximately 1:1 to 1:4. In order to prevent a predominant reaction between the oxygen and the hydrogen, the reaction should not take place at temperatures of above 350° C. However, below approximately 150° C., the activity of the catalyst is too low for the CO oxidation. The reaction should therefore take place as a function of the used catalyst at a defined temperature range, approximately between 150° and 350° C.

Since the CO oxidation is a highly exothermal reaction, the energy released in the CO oxidator 4 and transmitted by means of the heat exchange surface 5 to the reformer 3 is sufficient for a complete heating of the reformer 3. By means of a corresponding design of the reaction rates in the reformer 3 or in the CO oxidator 4, it is therefore possible to thermally couple the two partial devices such that the defined temperature level will be set automatically. By means of this arrangement, the reformer 3 and the CO oxidator 4 do not require an additional heating or cooling, including the pertaining control circuits, which considerably simplifies the overall system.

In the case of a defined temperature level, the design of the reaction rates takes place by way of the geometry of the system 1 and/or by way of the charged catalyst quantities or the dwell times of the gases in the reformer 3 or the CO oxidator 4. The reaction rates are set such that the energy quantity provided by the CO oxidator 4 corresponds to the energy quantity required by the reformer 3. However, in this case, the heat quantities carried by the hot gases out of the reformer 3 and the CO oxidator 4 must also be taken into account.

In an appropriate design of the overall system 1, the automatic setting of the temperature level is based on the nature of the two coupled partial processes. The reason is that, if more energy is released in the CO oxidator 4 as a result of the temperature increase, the reaction rate in the reformer 3 also rises whereby more energy is consumed there, which finally will, in turn, reduce the temperature. On the other hand, a temperature reduction, as may be caused by a reduced reaction rate in the CO oxidator 4, will also lead to a reduction of the reaction rate in the reformer 3. As a result, less energy is consumed in the reformer 3, so that the temperature level will rise again. In the case of a suitable thermal coupling and design of the two partial systems, this self-regulating mechanism simplifies the overall system considerably.

Figure 2:
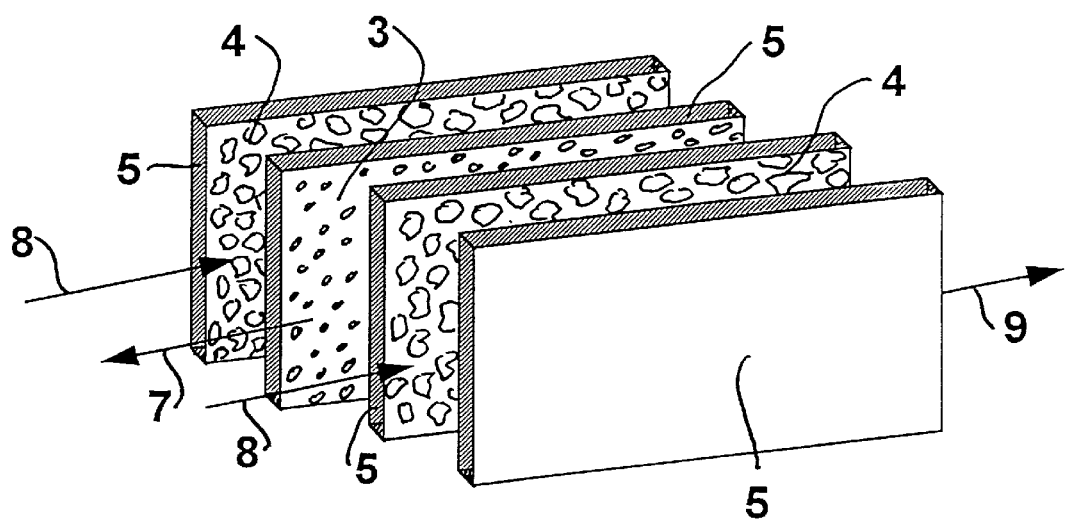
FIG. 2 is a schematic view of an embodiment of a system according to FIG. 1 in a plate construction.

FIG. 2 shows a schematic representation of an embodiment, the same parts have identical reference symbols as those shown in FIG. 1. The illustrated system 1 is built in a plate-type construction. The heat exchange surfaces 5 are placed in the housing, which is not shown, in the form of metal sheets arranged in parallel. Between the individual heat exchange surfaces 5, reforming and CO oxidation chambers 3, 4 alternately are formed which, as described above, are filled with a suitable catalyst material. However, in addition to being charged as a catalyst bulk, the catalyst material can be charged into the reaction chambers 3, 4 in a different manner, for example, by coating the heat exchange surfaces and/or suitable supporting structures. The feeding and discharging takes place in a manner known per se by external feed devices or by corresponding bores in the heat exchange surfaces 5. However, in addition to such plate arrangements, tube bundle arrangements are also suitable for the system according to the invention.

For the cold start of the system, it is conceivable to use the CO oxidator 4 temporarily as the catalytic burner. For this purpose, during the starting phase, a fuel/air mixture, such as liquid methanol/air or hydrogen/air is guided into the CO oxidator 4 and oxidized there on the CO oxidation catalyst. By means of this catalytic oxidation, thermal energy is released and thus the whole system 1 is heated rapidly. After a defined time period or when a defined temperature is reached in the system 1, the feeding of the fuel/air mixture to the CO oxidator 4 is stopped. Subsequently, the system 1 will then be operated in the above-described manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for starting a reformer, comprising:
   during a cold starting phase, feeding a fuel and air mixture into a gas purification stage comprising a catalyst for selectively oxidizing carbon monoxide in a reformate gas;
   oxidizing the fuel and air mixture on the catalyst, thereby releasing heat;
   directing the heat into a reformer by a heat exchange surface between the gas purification stage and the reformer thereby heating the reformer to an operating temperature, wherein the reformer comprises a catalyst for catalytic water vapor reforming of a water vapor and fuel mixture;
   after conclusion of the starting phase, stopping the feeding of the fuel and air mixture to the gas purification stage;
   feeding the water vapor and fuel mixture to the reformer and catalytically reforming the water vapor and fuel mixture, thereby generating the reformate gas comprising hydrogen and carbon monoxide; and
   feeding the reformate gas into the gas purification stage and selectively oxidizing the carbon monoxide.

2. A process for generating hydrogen gas in a system comprising a reformer and a gas purification stage, comprising:
   feeding water vapor and a fuel mixture to a reformer comprising a catalyst for water vapor reforming of the water vapor and fuel mixture, thereby forming a product gas containing hydrogen and carbon monoxide;
   directing the product gas to a gas purification stage comprising a catalyst;
   metering an oxygen-containing gas into the gas purification stage through a connection upstream of the gas purification stage or through plurality of metering points arranged along the operating length of the gas purification stage;
   selectively oxidizing the carbon monoxide in the gas purification stage while releasing heat; and
   transmitting the heat from the gas purification stage into the reformer by a heat exchange surface between the gas purification stage and the reformer, thereby completely heating the reformer; wherein the reformer and the gas purification stage are thermally coupled, thereby automatically setting a temperature level in the system.

3. The process according to claim 2, wherein an atomic ratio of CO in the product gas to oxygen in said oxygen-containing gas is from 1:1 to 1:4.

4. The process according to claim 2, wherein said oxidizing is at a temperature between 150° C. to 350° C.

5. A process according to claim 2, wherein said metering an oxygen-containing gas is through a connection upstream of the gas purification stage.

6. A process according to claim 2, wherein said reformer and said gas purification stage are in a common housing.

7. A process according to claim 2, wherein an energy quantity produced by said selectively oxidizing the carbon monoxide is equivalent to an energy quantity required by the reformer.

8. A process according to claim 2, wherein additional heating or cooling of the reformer or gas purification stage are not required.

9. A process for generating hydrogen gas, comprising:

feeding water vapor and a fuel mixture to a reformer comprising a catalyst for water vapor reforming of the water vapor and fuel mixture, thereby forming a product gas containing hydrogen and carbon monoxide;

directing the product gas to a gas purification stage comprising a catalyst;

metering an oxygen-containing gas into the gas purification stage through a connection upstream of the gas purification stage or through plurality of metering points arranged along the operating length of the gas purification stage;

selectively oxidizing the carbon monoxide in the gas purification stage while releasing heat; and transmitting the heat from the gas purification stage into the reformer by a heat exchange surface between the gas Purification stage and the reformer.

* * * * *